Nov. 17, 1931.   W. COLINA   1,832,003
HUB CAP
Filed April 12, 1929
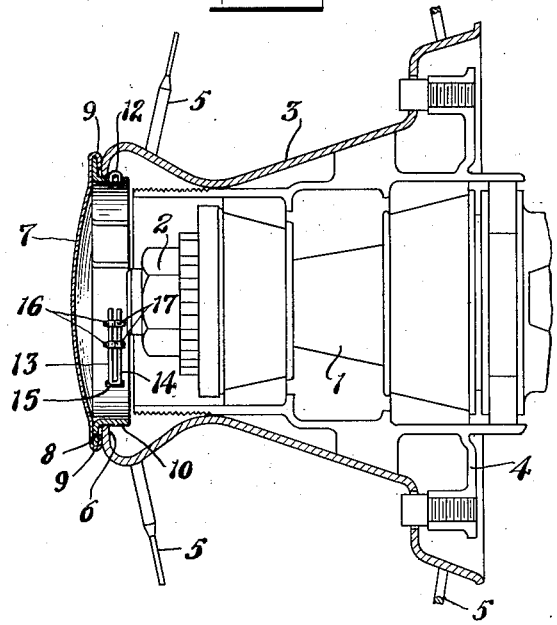
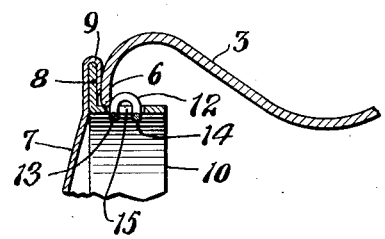
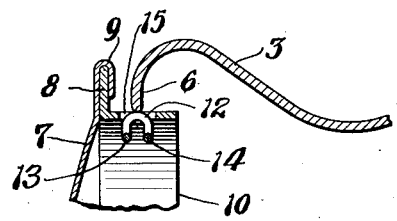
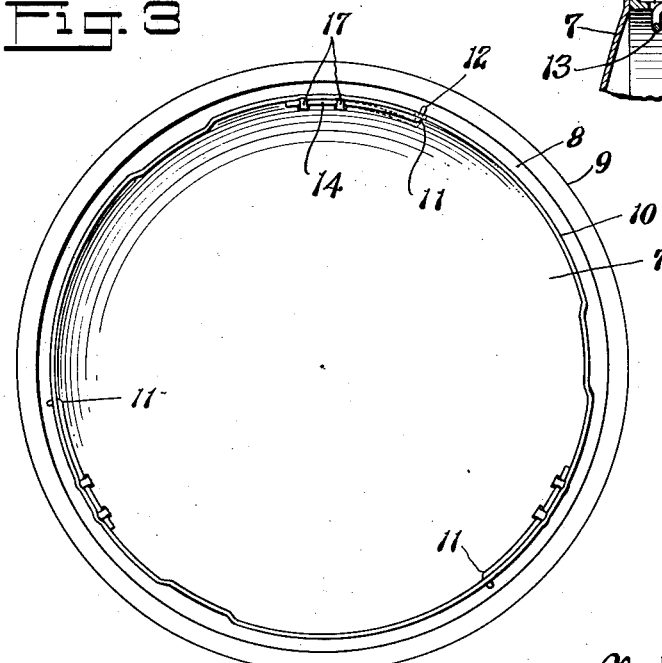
INVENTOR
William Colina
BY
ATTORNEYS Patented Nov. 17, 1931

1,832,003

UNITED STATES PATENT OFFICE

WILLIAM COLINA, OF WATERBURY, CONNECTICUT, ASSIGNOR TO SCOVILL MANUFACTURING COMPANY, OF WATERBURY, CONNECTICUT, A CORPORATION OF CONNECTICUT

HUB CAP

Application filed April 12, 1929. Serial No. 354,464.

This invention relates to certain improvements in caps for enclosing the ends of hubs or similar members having open ends, having been designed particularly for use in closing or covering up the hub part of wheels for motor vehicles and the like.

The hub caps are used for closing in the axle or hub end of vehicle wheels, particularly wheels for motor cars, so as to give an attractive appearance to the wheel and prevent the ingress of dirt, etc. into the wheel proper, and it is desirable that these caps be so designed and constructed that they can be readily put on and removed from the hubs with which they are to be used.

It is the especial object of the present invention to produce a hub cap construction of simple design comprising few parts, so that it can be cheaply made and assembled, which is strong and durable, this cap being provided with improved friction securing means so that it can be put on a wheel and removed therefrom simply by pushing it on and off, the cap being held on the hub by the frictional engagement of the parts with the hub.

With this and other objects not specifically referred to in view, the invention consists in certain novel parts, arrangements and combinations which will be described in connection with the accompanying drawings and the novel features pointed out in the claim hereunto annexed.

In the drawings,—

Figure 1 is a side view, partly broken away and partly in section, of the improved hub cap shown as applied to a hub of a motor car wheel;

Figure 2 is a detail sectional view of part of the construction shown in Figure 1;

Figure 3 is an inner face view of the cap, and

Figure 4 is a view similar to Figure 2, the cap and friction holding means being shown in the position assumed when the cap is being placed on the hub.

Referring now to these drawings, the construction selected to illustrate the invention is a hub cap, and this cap is shown as used for closing the axle end of a motor car wheel of the wire spoke type. It will be understood, however, that as to certain of its features the construction has been designed for and can be used in associating the cap with a member other than a hub provided with an open end.

In the particular construction illustrated there is shown a hub section of a conventional form of wire wheel comprising an axle 1 and a hub-nut 2, these parts being surrounded by a hub 3 suitably secured to a hub frame 4, this hub acting to support the wire spokes of the wheel indicated at 5. In this construction the lock-nut 2 is inside the hub structure, and the open end of the hub is formed with a peripheral flange 6, access to the axle end of the wheel being obtained through the opening in this flange. This opening is closed by the hub cap forming the subject matter of the present invention and which will now be described.

In the particular form of cap illustrated, the cap will include resilient friction holding means by which the cap is held in place on the hub, and may be removed therefrom simply by pushing it on and off. This cap includes an outer metal plate 7, which may be of brass or other suitable material, chrome plated if desired, which is of larger diameter than the inner diameter of the flange 6 of the hub before referred to. Associated with this outer plate 7 is an inner plate or ring 8, which acts as a carrier for the resilient friction devices by which the cap is held on the hub. This inner plate or ring 8 may be associated with the outer plate in any suitable manner, as by bending the outer edge of the plate 7 in over the edge of the plate 8, as indicated at 9.

This inner plate 8 is provided, preferably formed integrally therewith, with an inwardly extending flange or collar 10, in which are located the resilient friction devices by which the cap is held on the hub. While these friction devices may vary somewhat in character, the form shown is that preferred, as such form is economical to produce and is readily assembled. As shown, there are provided three of these friction devices, indicated generally by the numeral 11, at suitably spaced intervals around the collar or flange 10. Each of these friction devices includes a spring wire member, which is bent to form a loop 12, and a pair of legs 13, 14, the loop being formed at one end of the member and arranged at right angles to the legs and projecting through an opening 15 formed in the flange or collar 10. These holding members are resilient, and the normal position of the loop is in its projected position, that is, in the position shown in Figures 1 and 2.

It will be observed that the flange or collar 10 is substantially the diameter of the opening in the flange 6 of the hub 3, but that the holding loops 12 are of larger diameter than the opening in the flange 6. In assembling this cap with the hub, the flange 10 and the loops 12 are simply forced through the opening in the hub 6, the loops depressing so as to pass the flange, as shown in Figure 4. When the flange 10 and the loops have been entirely forced through the opening, the spring of the wire causes the loops to project through the openings behind the flange 6 of the hub. The loops are positioned in the collar so as to lie snugly behind the flange 6, thus holding the cap close against the outer face of the flange 6 and closing the opening in the hub end. To remove the cap it is simply necessary to pry it off the hub by the use of a suitable tool, such as a screw driver.

The spring wire holding devices may be held in position in any suitable manner, a convenient one being that shown in which the flange or collar 10 is slit to form tongues 16, 17, which are oppositely bent over the legs 13, 14, as shown in Figure 1, thus holding the legs firmly in position, these tongues being positioned toward the outer or free end of the legs so as to permit the desired resilient or spring action of the loop end of the holder.

It will be seen that with the construction shown and described a very simple and efficient cap has been provided for the purpose intended, one that is simple and, therefore, economical to make, which is strong, stays on the wheel, and can be positioned on and removed from the wheel in an easy and expeditious way.

While the invention has been shown and described in its preferred form, it will be appreciated that certain variations may be made in the exact construction and arrangement of the parts, and that the cap may be used with other constructions than a hub. The invention is, therefore, not to be limited to the exact construction shown and described but may be varied without departing therefrom as defined in the appended claim.

What I claim is:

An automobile hub cap assembly comprising a metal hub open at one end and having a continuous inwardly extending radial flange surrounding the opening, a hub cap arranged to be associated with the hub in any circumferential position by a straight line movement, said cap including a supporting plate having an axially extending flange dimensioned to pass through the hub opening, said flange being provided with openings and spring wire holders each bent to form a par of spaced legs secured to the inner face of the holder and a loop at right angles to the legs projecting through an opening in the cap flange and acting to spring into position behind the hub flange when the cap flange is forced through the hub opening.

In testimony whereof, I have hereunto set my hand.

WILLIAM COLINA.